(12) United States Patent
Takahashi (10) Patent No.: US 7,334,264 B2
(45) Date of Patent: Feb. 19, 2008

(54) COMPUTER VIRUS GENERATION DETECTION APPARATUS AND METHOD

(75) Inventor: Toshinari Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 848 days.

(21) Appl. No.: 10/366,568

(22) Filed: Feb. 14, 2003

(65) Prior Publication Data

US 2003/0159064 A1   Aug. 21, 2003

(30) Foreign Application Priority Data

Feb. 15, 2002  (JP)  ............................ P2002-039087

(51) Int. Cl.
| | |
|---|---|
| G06F 11/00 | (2006.01) |
| G06F 12/14 | (2006.01) |
| G06F 12/16 | (2006.01) |
| G06F 15/18 | (2006.01) |
| G08B 23/00 | (2006.01) |
| G06F 17/30 | (2006.01) |
| G06F 7/04 | (2006.01) |
| G06K 9/00 | (2006.01) |

(52) U.S. Cl. ........................... 726/24; 726/22; 726/23; 726/25; 713/188
(58) Field of Classification Search .............. 713/188; 726/22–25
See application file for complete search history.

(56) References Cited

U.S. PATENT DOCUMENTS

| | | | | |
|---|---|---|---|---|
| 5,414,833 A | * | 5/1995 | Hershey et al. ................ 726/22 |
| 5,796,942 A | * | 8/1998 | Esbensen ...................... 726/13 |
| 6,321,338 B1 | * | 11/2001 | Porras et al. .................. 726/25 |
| 6,324,656 B1 | * | 11/2001 | Gleichauf et al. ............ 714/37 |
| 6,466,981 B1 | * | 10/2002 | Levy .......................... 709/227 |
| 6,772,345 B1 | * | 8/2004 | Shetty ......................... 726/24 |
| 6,886,099 B1 | * | 4/2005 | Smithson et al. ............. 726/24 |
| 7,089,589 B2 | * | 8/2006 | Chefalas et al. .............. 726/22 |
| 2002/0078382 A1 | * | 6/2002 | Sheikh et al. ............... 713/201 |
| 2002/0083341 A1 | * | 6/2002 | Feuerstein et al. .......... 713/201 |
| 2002/0116639 A1 | * | 8/2002 | Chefalas et al. ............ 713/201 |
| 2002/0144156 A1 | * | 10/2002 | Copeland, III .............. 713/201 |
| 2002/0194489 A1 | * | 12/2002 | Almogy et al. ............. 713/200 |
| 2002/0194490 A1 | * | 12/2002 | Halperin et al. ............ 713/200 |
| 2003/0074578 A1 | * | 4/2003 | Ford et al. .................. 713/200 |
| 2003/0084322 A1 | * | 5/2003 | Schertz et al. .............. 713/200 |
| 2003/0110392 A1 | * | 6/2003 | Aucsmith et al. ........... 713/200 |
| 2004/0193896 A1 | * | 9/2004 | Kaneko ....................... 713/188 |

OTHER PUBLICATIONS

Anderson, Debra et al. "Next Generation Intrusion Detection Expert System (NIDES) Software Users Manual", Dec. 1994, pp. 1-10 & 23-46.*

* cited by examiner

*Primary Examiner*—Kambiz Zand
*Assistant Examiner*—Michael J Simitoski
(74) *Attorney, Agent, or Firm*—Finnegan, Henderson, Farabow, Garrett & Dunner, L.L.P.

(57) ABSTRACT

An apparatus includes a server connected between a first computer network in which a computer virus may generate and a second computer network or a computer system as an object of security protection. In the apparatus, a collection unit collects irregular data representing a possibility of generation of the computer virus that may attack the server. A decision unit decides whether the computer virus is being generated on the computer network in accordance with the irregular data. A notification unit notifies the second computer network or the computer system of generation of the computer virus when the decision unit decides that the computer virus is being generated.

13 Claims, 7 Drawing Sheets

2001/12/26 15:05:43 JST 32.97.110.70 ss05. co. us. ibm. com-
GET /cool/vmware/FAQ. html HTTP/1.0 200

2001/12/26 13:35:49 JST 207.140.168.143 crawler. tivra com-
GET /cool/vmware/FAQ. ht HTTP/1.0 404 "File Not Found"

2001/08/01 20:10:27 JST 212.75.119.101 artbi. se. com. pl-"GET/default. ida ?NNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNNN%u9090%u6858%ucbd3%u7801%u9090%u6858%ucbd3%u7801%u9090%u6858%ucbd3%u7801%u9090%u9090%u8190%u00c3%u0003%u8b00%u531b%u53ff%u0078%u0000%u00=a HTTP/1.0"404"File Not Found"

FIG. 6

2001/09/18 22:17:51 JST 210.232.186.38 www2. tomonet. co. jp-GET /c/winnt/system32/cmd. exe ?/c+dir HTTP/1.0 404 "File Not Found"

COMPUTER VIRUS GENERATION DETECTION APPARATUS AND METHOD

CROSS-REFERENCE TO RELATED APPLICATIONS

This application is based upon and claims the benefit of priority from the prior Japanese Patent Application P2002-039087, filed on Feb. 15, 2002; the entire contents of which are incorporated herein by reference.

FIELD OF THE INVENTION

The present invention relates to a computer virus generation detection apparatus and a method for early prevention of damage by a computer virus in a computer network or a computer system as an object of security protection.

BACKGROUND OF THE INVENTION

Recently, attention has been focused on security techniques to protect a computer system's hardware and software from a disaster, an accident, an unjust investigation, a destruction or a change by a computer virus. Especially, in proportion to the rapid spread of Internet or Intranet, security on a network is attached importance.

In the prior art, in order to protect against a mixture of computer viruses, a countermeasure using filtering software (for example, Virus Buster presented by TrendMicro Inc.) is mainly adopted. In this filtering software, countermeasure data called as "vaccine" detects the computer virus and deletes it.

Furthermore, as for the computer virus which attacks and damages a security hole of an operating system (for example, Windows(R) presented by Microsoft Inc.), damage caused by the computer virus is prevented by applying a modification program to stop up the security hole.

However, in the prior art, the countermeasure for the computer virus is executed after the computer virus is found and specified. Briefly, the countermeasure is forestalled in every attempt for damage of new (unknown) computer virus. In other words, there is a time lag corresponding to a period from the generation of the computer virus to the countermeasure of the computer virus. Accordingly, the computer virus may rapidly spread in several hours before countermeasure data, such as the vaccine or the modification program, are distributed. As a result, the computer system is greatly damaged in the several hours by the computer virus.

SUMMARY OF THE INVENTION

It is an object of the present invention to provide a computer virus generation detection apparatus and a method for early prevention of the damage by the computer virus in a computer network or a computer system as an object of security protection.

According to the present invention, there is provided an apparatus for detecting generation of a computer virus, comprising: a collection unit configured to collect irregular data representing a possibility of generation of the computer virus on a computer network; and a decision unit configured to decide whether the computer virus is generated on the computer network in accordance with the irregular data.

Further in accordance with the present invention, there is also provided an apparatus for detecting generation of a computer virus, said apparatus including a server connected between a first computer network in which the computer virus may generate and a second computer network or a computer system as on object of security protection, said apparatus comprising: a collection unit configured to collect irregular data representing a possibility of generation of the computer virus that may attack the server; a decision unit configured to decide whether the computer virus is being generated on the computer network in accordance with the irregular data; and a notification unit configured to notify the second computer network or the computer system of generation of the computer virus when said decision unit decides that the computer virus is being generated.

Further in accordance with the present invention, there is also provided a method for detecting generation of a computer virus, comprising: collecting irregular data representing a possibility of generation of the computer virus on a computer network; and deciding whether the computer virus is being generated on the computer network in accordance with the irregular data.

Further in accordance with the present invention, there is also provided a method for detecting generation of a computer virus in a server, the server being connected between a first computer network in which the computer virus may generate and a second computer network or a computer system as an object of security protection, the method comprising: collecting irregular data representing a possibility of generation of the computer virus of which attack object is the server; deciding whether the computer virus is being generated on the computer network in accordance with the irregular data; and notifying the second computer network or the computer system of generation of the computer virus when the computer virus is being generated.

Further in accordance with the present invention, there is also provided a computer program product, comprising: a computer readable program code embodied in said product for causing a computer to detect generation of a computer virus on a computer network, said computer readable program code having: a first program code to collect irregular data representing a possibility of generation of the computer virus on a computer network; and a second program code to decide whether the computer virus is being generated on the computer network in accordance with the irregular data.

Further in accordance with the present invention, there is also provided a computer program product, comprising: a computer readable program code embodied in said product for causing a computer to detect generation of a computer virus in a server, the server being connected between a first computer network in which the computer virus may generate and a second computer network or a computer system as an object of security protection, said computer readable program code having: a first program code to collect irregular data representing a possibility of generation of the computer virus that may attack the server; a second program code to decide whether the computer virus is being generated on the computer network in accordance with the irregular data; and a third program code to notify the second computer network or the computer system of generation of the computer virus when the computer virus is being generated.

DETAILED DESCRIPTION OF THE INVENTION

Hereafter, various embodiments of the present invention will be explained by referring to the drawings.

Figure 1:
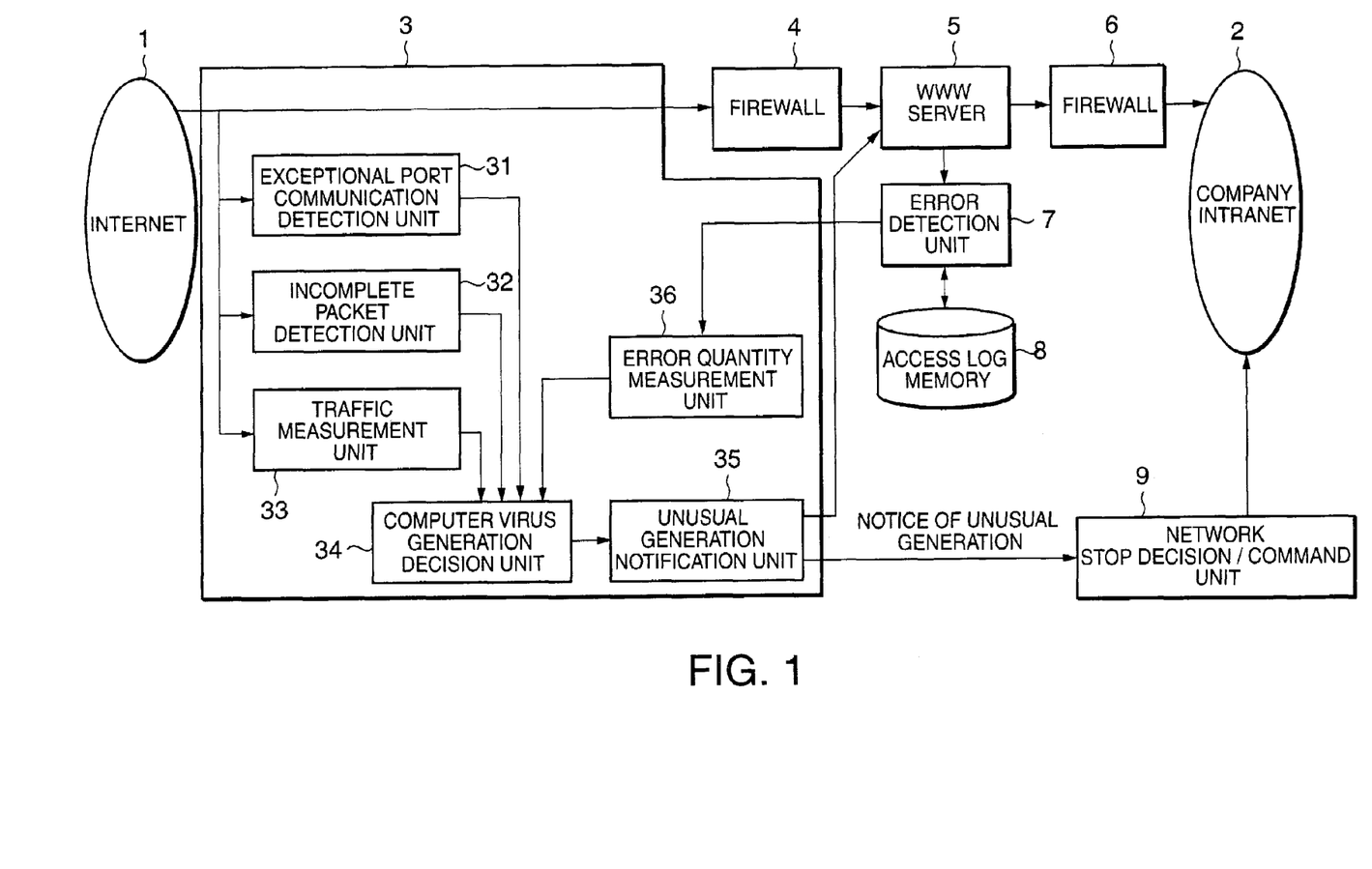
FIG. 1 is a block diagram of the computer virus generation detection apparatus according to the first embodiment of the present invention.

FIG. 1 is a block diagram showing the computer virus generation detection apparatus according to the first embodiment of the present invention. As shown in FIG. 1, the computer virus generation detection apparatus of the first embodiment is connected to an Internet 1. Furthermore, WWW server 5 is connected to the Internet 1 through a firewall 4, and a company Intranet 2 is connected to the Internet 1 through a firewall 6. The firewalls 4 and 6, respectively, execute filtering for improper packet from a viewpoint of security protection. However, the firewalls 4 and 6 are not a necessary component for the present invention. Furthermore, as shown in FIG. 1, the WWW server 5 is located outside of the company Intranet 2 through the firewall 6, i.e., at the side of the Internet 1. The WWW server 5 prepares an access log memory 8 for storing access record (log) to the WWW server 5, and an error detection unit 7 for detecting error occurred for access to the WWW server 5 by referring to the log stored in the access log memory 8.

As a means for collecting irregular data representing a possibility of generation of the computer virus in the Internet 1, the computer virus generation detection apparatus 3 includes an exceptional port communication detection unit 31, an incomplete packet detection unit 32, a traffic measurement unit 33, and an error quantity measurement unit 36. Furthermore, the computer virus generation detection apparatus 3 includes a computer virus generation decision unit 34 for synthetically deciding whether the computer virus is being generated based on the irregular data acquired from the units 31, 32, 33 and 36, and an unusual generation notification unit 35 for informing unusual generation of the computer virus based on decision result of the unit 34 to the outside. This unusual generation notification unit 35 communicates with a network stop decision/command unit 9. The network stop decision/command unit 9 operates the company Intranet 2, and can cut a connection between the company Intranet 2 and the Internet 1 (network stop). In this case, the unusual generation notification unit 35 is not always necessary for the computer virus generation detection unit 3. For example, the decision result acquired by the computer virus generation detection unit 34 may be output to a network manager through a display. The above-mentioned computer virus generation detection apparatus 3 can be realized as software operating on various kinds of computers.

In general, the computer virus is electronic information such as program data or combination of the program data transferred through a memory medium or a communication medium, and includes the contents or the format which a receiving user (addressee) does not usually imagine. For example, information that makes the receiving user's computer work unusually from malice may be a computer virus. However, even if information is reluctantly created or used without malice, the information often causes an unexpected result. This information may also called "the computer virus". Furthermore, as for transmission form and medium of the computer virus, there are no limitations. For example, the computer virus may exist in the memory medium, the computer virus may be transferred with an electronic mail sent or a file commonly used, or the computer virus may multiply through Internet normally called "Worm". Briefly, various kinds of the transmission form and the medium are applied for the computer virus. Furthermore, even if transmittal information is normally expected for the receiving user, if the information causes an unexpected result by the combination, the transmission order or the transmission speed, this information may be called "the computer virus" as a whole.

In the company network, an infection of the computer virus into the Intranet preparing a firewall occurs starting from a human system such as receiving of the electronic mail including the computer virus or access to a company homepage. Accordingly, the infection of the computer virus may be delayed for 1~10 hours from the generation of the computer virus. Furthermore, the computer virus may infect other computer system through TCP/IP communication.

In the computer virus generation detection apparatus 3 of the present invention, it is early decided early whether such computer virus is being generated on the Internet 1 while this computer virus is not specified yet. Briefly, before countermeasure data such as vaccine is provided with clearance of the kind or the special feature of the computer virus, i.e., in a state of unknown computer virus, the generation of the unknown computer virus can be detected. In order to detect the computer virus, irregular data representing a possibility of generation of the computer virus are collected. The irregular data represents facts, such as TCP/IP communication using an exceptional port normally unused, the generation of one or more incomplete packets based on unusual TCP/IP communication, an unusual increase of traffic (communication quantity), and an unusual increase of error quantity.

Figure 2:
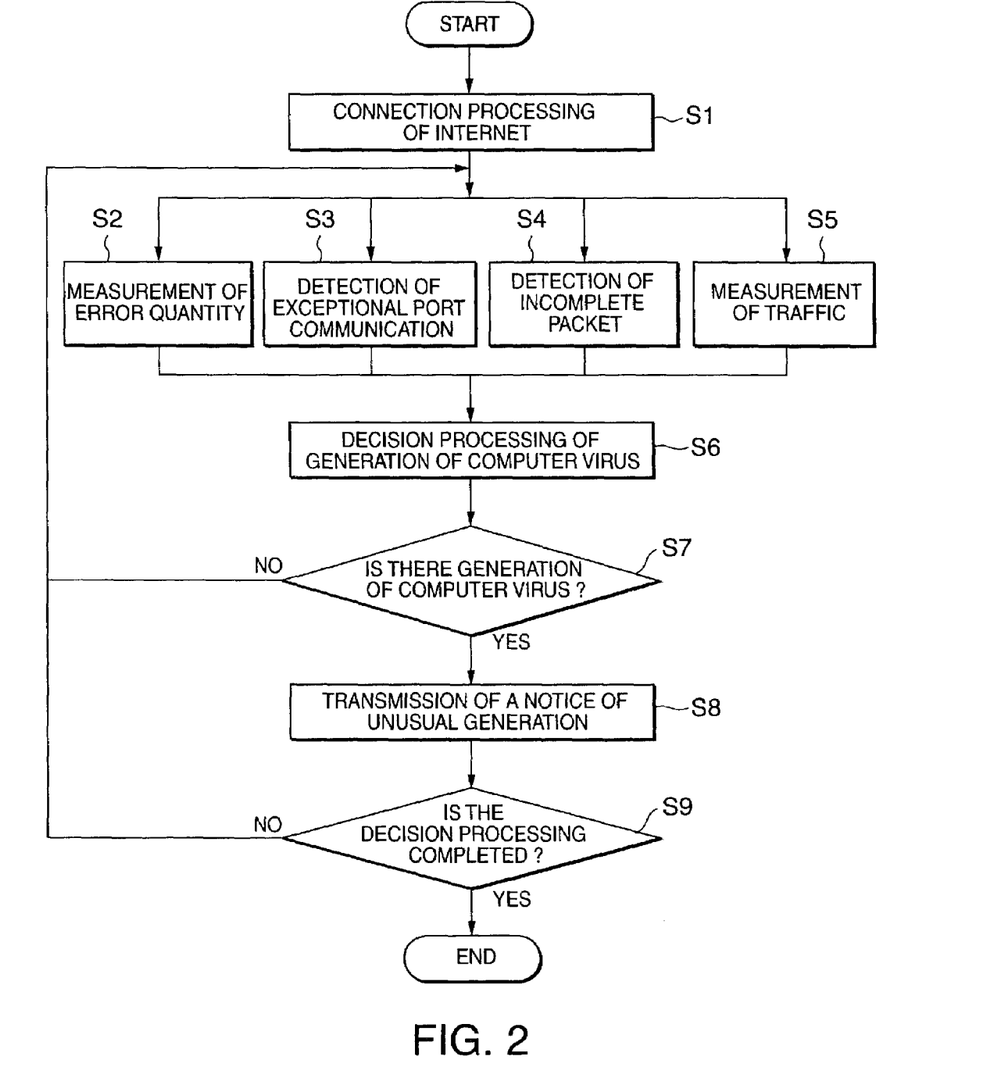
FIG. 2 is a flow chart of processing of the computer virus generation detection apparatus according to the first embodiment of the present invention.

FIG. 2 is a flow chart showing operation of the computer virus generation detection apparatus according to the first embodiment of the present invention. First, connection processing between the computer virus generation detection apparatus 3 and the Internet 1 is executed (S1). After connecting to the Internet 1, measurement of the error quantity (S2), detection of communication using the exceptional port (S3), detection of the incomplete packet (S4) and measurement of traffic (S5) are respectively executed. In FIG. 2, each processing S2~S5 is typically executed in parallel. However, these processing may be executed in arbitrary order. In each processing S2~S5, the irregular data representing a possibility of generation of the computer virus are collected and sent to the computer virus generation decision unit 34. The computer virus generation decision unit 34 synthetically decides whether an unknown computer virus is being generated by referring to the irregular data collected at steps S2~S5. This decision processing includes a processing for comparing the measured error quantity or the measured traffic with a threshold, a statistical processing, or a heuristic processing.

Next, if it is decided that the computer virus is being generated (S7), the processing is forwarded to step S8. If it is not decided, the processing is returned to steps S2~S5. At step S8, the unusual generation notification unit 35 sends an unusual generation notice representing the generation of unknown computer virus to the network stop decision/command unit 9.

Figure 3:
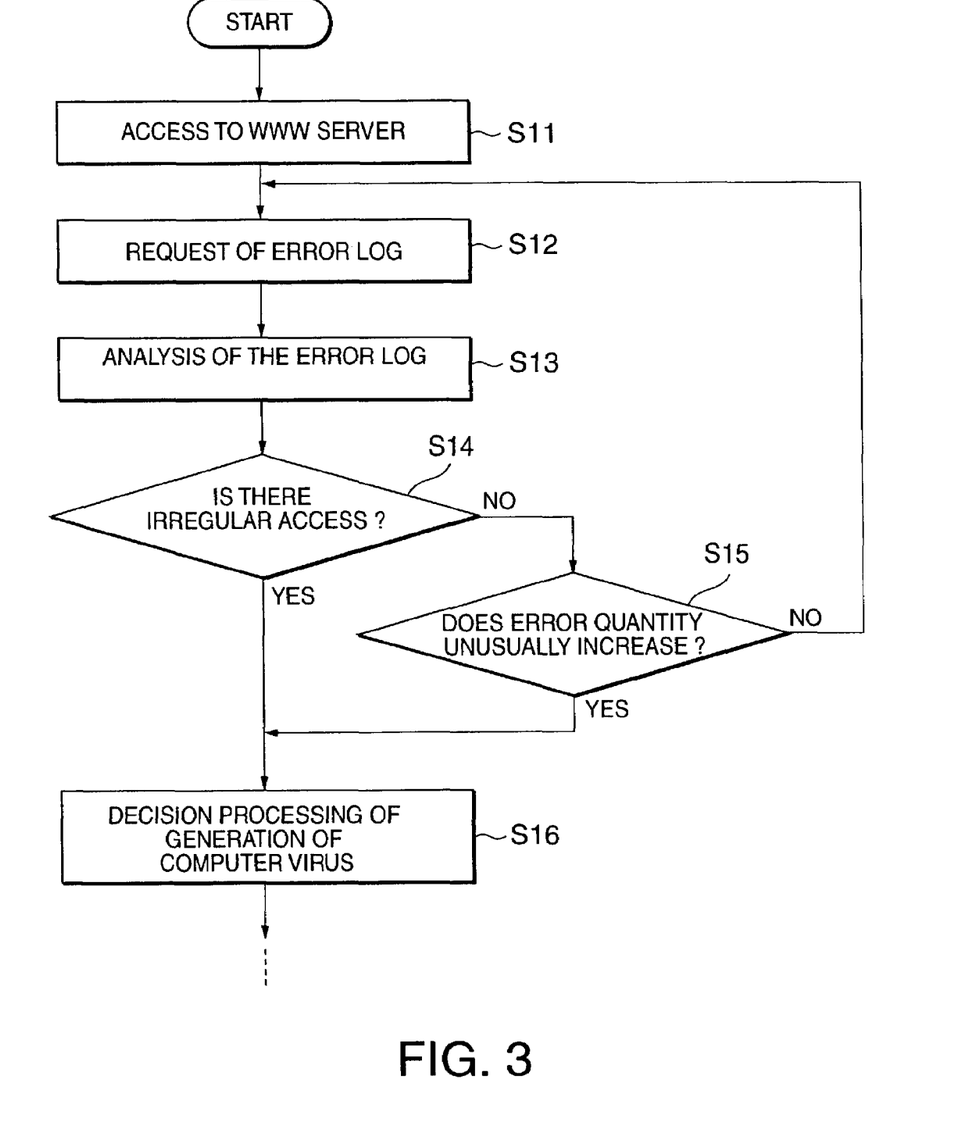
FIG. 3 is a flow chart of decision of generation of the computer virus based on error quantity measurement according to the first embodiment of the present invention.

In this place, decision processing (S6) of generation of the computer virus based on the measurement of error quantity (S2) is explained by referring to FIG. 3 (flow chart) and FIGS. 4~7. First, the error quantity measurement unit 36 in the computer virus generation detection apparatus 3 accesses to the WWW server 5 through the error detection unit 7 (S11). When the computer virus is being generated, the company Intranet 2 is not infected with the computer virus. Because most computer viruses are generated from outside (mainly foreign countries) of the company Intranet 2, the computer virus being generated first takes aim of the WWW server 5 of which address (for example, ".com" domain) is clearly specified. After that, the computer virus gradually spreads to another server. When a user accesses using a browser to WWW server 5 infected by the computer virus, the company Intranet 2 is also infected. From a point of protection against the computer virus, a unit able to early find the generation of the computer virus is the WWW server 5 first aimed by the computer virus.

Figure 4:
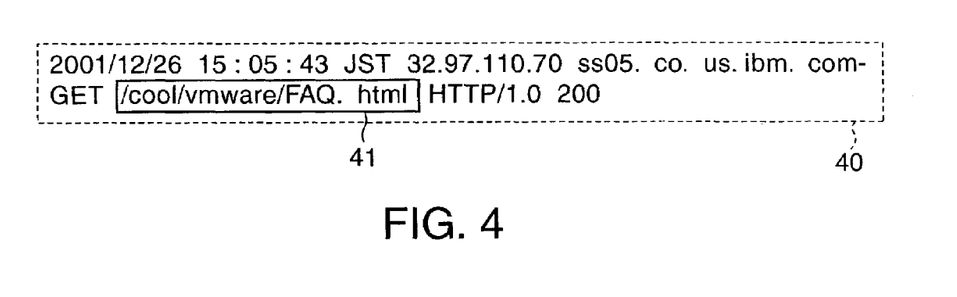
FIG. 4 is a schematic diagram of one example of an access log in the case of usually accessing to a server.
Figure 5:
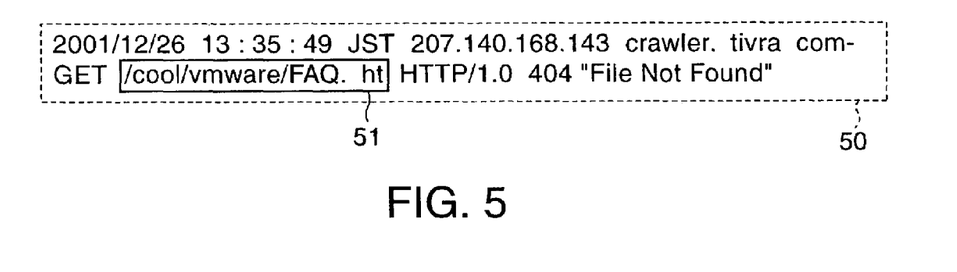
FIG. 5 is a schematic diagram of one example of the access log in the case of accessing to the server with a user's type miss.

The error quantity measurement unit 36 requests an error log from access logs stored in the access log memory 8 through the error detection unit 7 of the WWW server 5 (S12). Then, the error quantity measurement unit 36 analyzes the error log acquired from the error detection unit 7 (S13). FIG. 4 shows one example of the access log 40 normally accessed. FIG. 5 shows one example of the access log 50 in the case of occurring error by a user's miss of inputting "URL". These access logs 40 and 50 represents a sample log in the case that the user accesses to Web page of URL "http://host/cool/vmware/FAQ.html" by Browser. The contents 41 in FIG. 4 are correct URL. However, when the user erroneously types URL 51 in FIG. 5, the WWW server 5 processes the URL 51 as an input error, and the error log 50 in FIG. 5 is recorded in the access log memory 8. This error log 50 is irrelevant to the computer virus.

Figure 6:
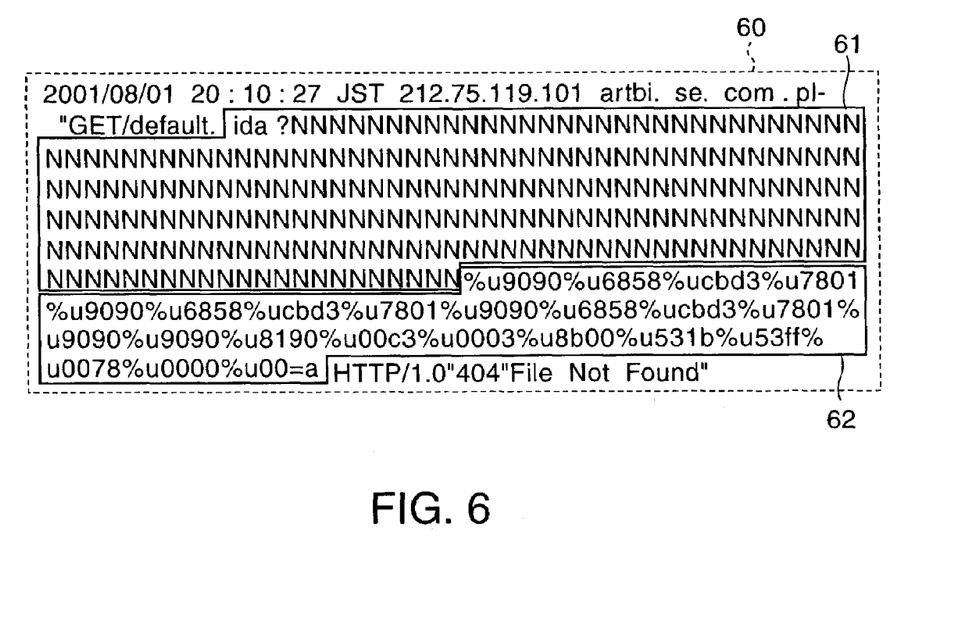
FIG. 6 is a schematic diagram of one example of the access log in the case of unusually accessing the server.

On the other hand, FIG. 6 shows one example of the access log in the case of irregularly accessing to the WWW server 5. For example, in the case of the computer virus "Nimda" that caused trouble recently, the computer virus irregularly accessed the WWW server 5 by aiming at a security hole of the WWW server 5 as shown in the access log 60 in FIG. 6. Concretely, a URL including very long character strings 61 and 62 in FIG. 6 is sent to the WWW server 5. In the WWW server 5, the character strings 62 are piled in a stack as an arbitrary program and executed by manager authority (root authority). This technique is generally called an "attack". The attack is executed by a command input of the user's operation or executed by a program automatically. The access indicating a long URL shown in FIG. 6 is decided to be irregular access (S14). By checking a length of the character strings of URL, it is easily decided.

Figure 7:
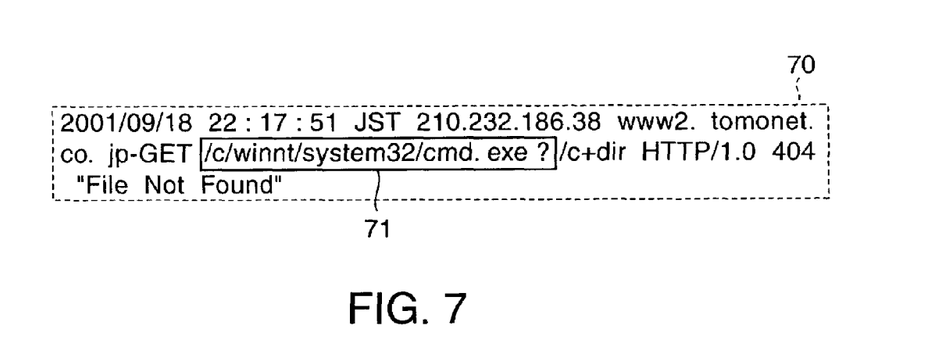
FIG. 7 is a schematic diagram of another example of the access log in the case of unusually accessing the server.

FIG. 7 shows another example of the access log in the case of irregularly accessing to the WWW server 5. In FIG. 7, a character string 71 represents activation of "C:¥winnnt¥system32¥cmd.exe" on Windows(R) operating system in order to execute arbitrary program. This irregular access is recorded as the error log 70 in FIG. 7. It is not easily decided that the error log 70 is "attack". However, a pattern of the error log 70 is different from a pattern of the user's type miss. Accordingly, by checking the pattern of the error log, the error log is decided as an "attack".

In the case of generating the computer virus, the error shown in FIGS. 6 and 7 temporarily increases. Accordingly, the error quantity measurement unit 36 measures the increase of error quantity per unit time. This measurement result is provided for decision processing by the computer virus generation decision unit 34.

In FIG. 3, if the error log is decided to be irregular access (S14), decision processing of generation of the computer virus is executed (S16). However, before executing step S16, an unusual increase of the error quantity may be decided (S15). Furthermore, without the decision of an irregular access shown in FIGS. 6 and 7, the unusual increase of the error quantity may be decided.

Figure 8:
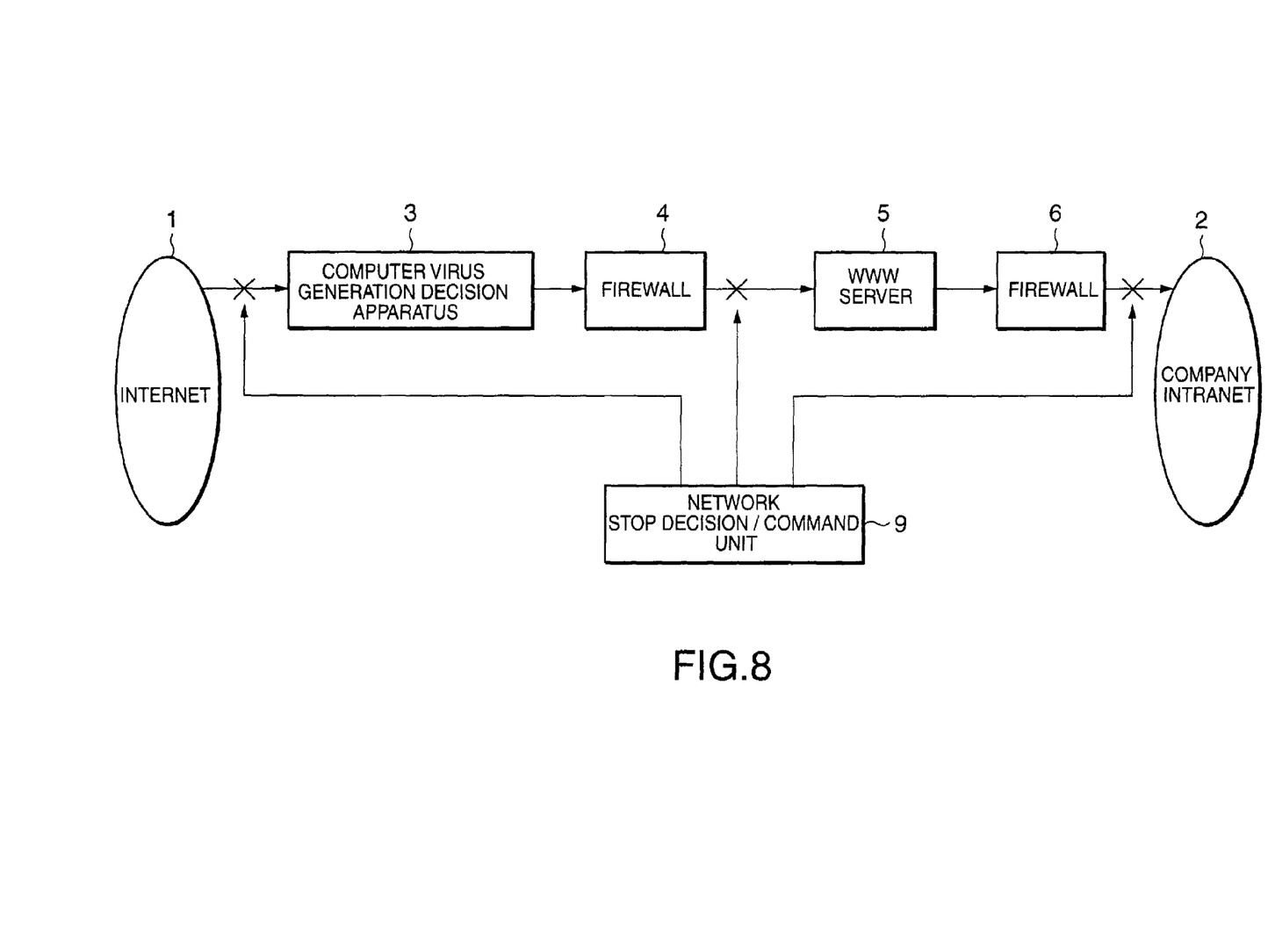
FIG. 8 is a schematic diagram showing cut positions of a network in a computer network system according to the first embodiment of the present invention.

The computer virus generation decision unit 34 receives the irregular data representing the unusual increase of error quantity measured by the error quantity measurement unit 36, and decides whether the computer virus is being generated by comparing the irregular data with a threshold. It is desirable that a user interface for the user to arbitrarily set the threshold is prepared. When the computer virus generation decision unit 34 decides that the computer virus is being generated, this information is sent to the unusual generation notification unit 35. The unusual generation notification unit 35 establishes a communication with the network stop decision/command unit 9, and sends an unusual generation notice representing the generation of the computer virus to the network stop decision/command unit 9. In response to the unusual generation notice, the network stop decision/command unit 9 cuts (closes) a connection or subconnections between the Internet 1 and the company Intranet 2 at several cut position (X) shown in FIG. 8.

As mentioned-above, in the first embodiment, on the Internet 1 outside of the company Intranet 2 through the firewalls 4 and 6, the generation of the computer virus is detected. When detecting the generation of the computer virus, it is sufficiently expected that the company Intranet is not infected with the computer virus yet. Moreover, in a period until detail information or countermeasure information related to this computer virus is made clear, the company Intranet 2 is stopped or a part of service such as WWW is stopped if necessary. Especially, in the first embodiment, the generation of not only known computer virus but also unknown computer virus is perfectly detected. This detection is extremely effective for countermeasure of security. As a result, a suitable countermeasure is taken before the damage rapidly enlarges by spreading the infection of the computer virus. In one example, it is often the case that the computer virus spreads in the daytime of USA. In Japan, the countermeasure based on the present invention can be automatically taken in the nighttime, i.e., before the employee's going to office.

In the case of generating an unknown computer virus, it is desirable that a user finally decides whether the unknown computer virus is dangerous. This can be realized when the computer virus generation decision unit 34 and the unusual generation notification unit 35 receive an operation of the user (system manager). On the other hand, if the network stop decision/command unit 9 automatically stops the network without the user's decision, it may provide a hindrance for operation of the company Intranet 2. However, it may be better than a state that the company Intranet exposes itself to the attack of the computer virus. Especially, it is desirable that the company Intranet 2 is unconditionally stopped in the nighttime.

Figure 9:
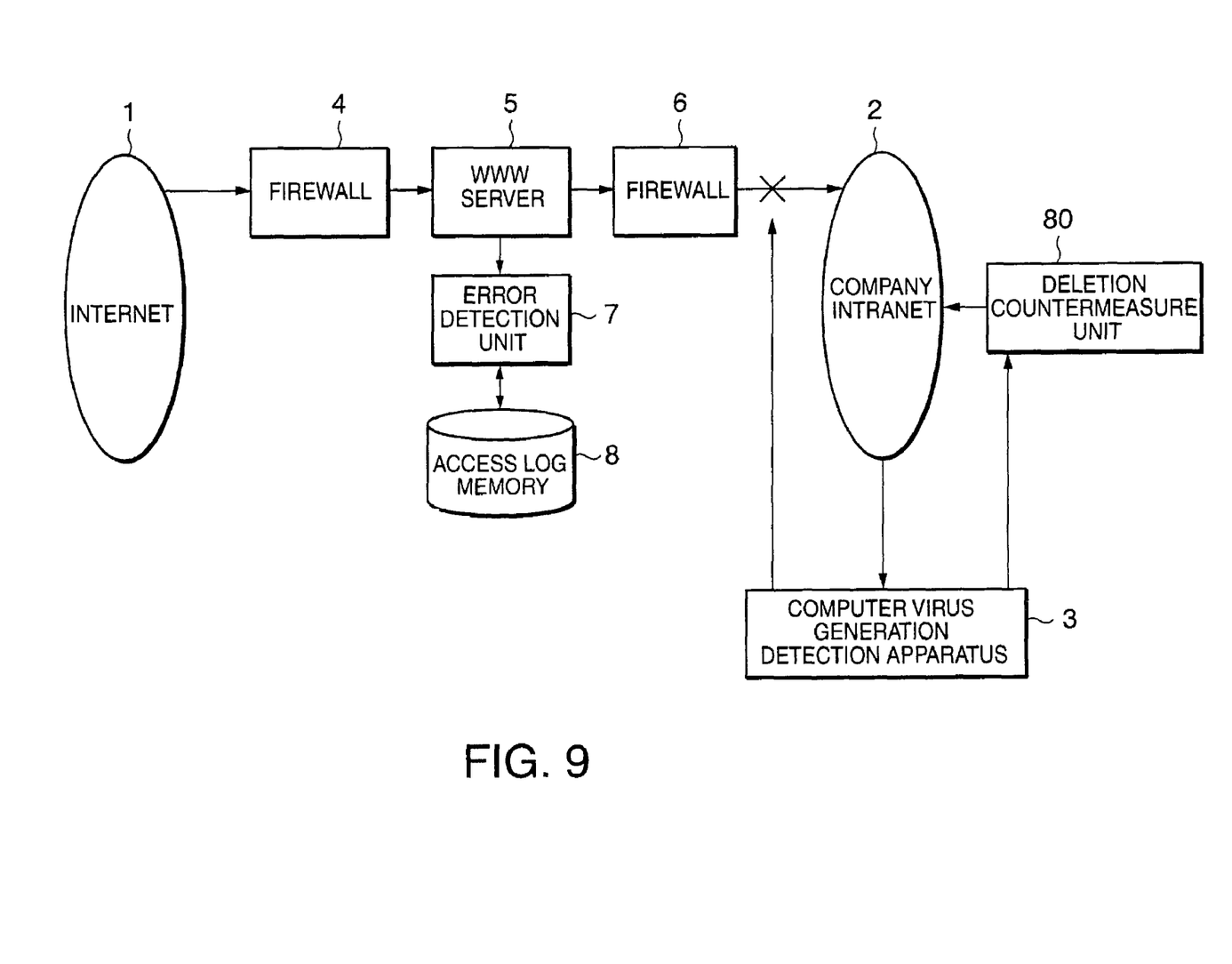
FIG. 9 is a block diagram of the computer virus generation detection apparatus according to the second embodiment of the present invention.

In the first embodiment, the computer virus generation detection apparatus 3 is located outside the company Intranet 2 through the firewalls 4 and 6. On the other hand, in the second embodiment of the present invention, the computer virus generation detection apparatus 3 is located inside of the company Intranet 2. FIG. 9 is a block diagram of a system including the computer virus generation detection apparatus 3 according to the second embodiment of the present invention.

In FIG. 9, the internal component of the computer virus generation detection apparatus 3 is the same as that of the first embodiment shown in FIG. 1. However, in the second embodiment, an object to detect the attack of the computer virus is not the WWW server 5 but a server (not shown in FIG. 9) included in the company Intranet 2. Furthermore, as for the detection of exceptional port communication, the detection of incomplete packet and the measurement of traffic, the object to detect the attack of the computer virus is the company Intranet 2. In the second embodiment, countermeasure for damage of the computer virus in the company can be early executed in the same way of the first embodiment. Furthermore, when it is decided that the computer virus generates outside of the company Intranet 2, a connection (also called a sub connection) between the company Intranet 2 and the outside is cut at a position (X) as shown in FIG. 9.

Furthermore, in the second embodiment, a deletion countermeasure unit 80 cooperating with the computer virus generation detection apparatus 3 is set. As the countermeasure data to delete the known computer virus, for example, the deletion countermeasure unit 80 distributes a modification program to treat a pattern file or a security hole to a client machine in the company Intranet 2. This deletion countermeasure unit 80 may be added to the component of the first embodiment.

In the second embodiment of the present invention, an operational effect that is the same as the first embodiment can be obtained. Furthermore, a plurality of servers including not only the company server 2 but also the outside server (for example, the WWW server 5) may be respectively the object to detect the attack. In this case, the ability to detect the computer virus can be further raised.

The present invention is not limited to above-mentioned embodiments, and can be executed as various modifications. For example, detection and countermeasure of the known computer virus, such as file infection type or macro infection type, may be used together with operation of the present invention. In this case, security countermeasure becomes firmer.

As mentioned-above, in embodiments of the present invention, the generation of the computer virus on the network is detected at an early stage. Accordingly, it prevents the computer network or the computer system as the object of security protection from becoming infected with the computer virus and damaging the network or system.

For embodiments of the present invention, the detection processing of the generation of computer virus of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in embodiments of the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for detecting a computer virus, the apparatus being connected between an Internet and a server, the server being located outside of a company Intranet, said apparatus comprising:
   a collection unit configured to collect communication data in the server;
   a decision unit configured to decide whether a computer virus exists in the server in accordance with the communication data;
   a notification unit configured to notify the company Intranet of the existence of the computer virus when said decision unit decides that the computer virus exists; and
   a network stop unit configured to cut a connection between the Internet and the company Intranet when said decision unit decides that the computer virus exists.

2. The apparatus according to claim 1, wherein said collection unit requests an error log from the server, and analyzes the error log in order to decide whether the server was irregularly accessed.

3. The apparatus according to claim 2, wherein said collection unit checks a character length of a URL included in the error log, and decides that the server was irregularly accessed if the character length of the URL is above a threshold.

4. The apparatus according to claim 2, wherein said collection unit checks a pattern of a URL included in the error log, and decides that the server was irregularly accessed if the pattern of the URL is different from a user's type pattern.

5. The apparatus according to claim 2, wherein said collection unit measures an error quantity per unit time, and decide whether the error quantity increases based on the measurement result.

6. The apparatus according to claim 5, wherein, if said collection unit decides that the server was irregularly accessed or the error quantity increases, said decision unit compares the error quantity with a threshold, and decides whether the computer virus exists in the server.

7. The apparatus according to claim 1, wherein said network stop unit cuts a first sub-connection between the Internet and the server.

8. The apparatus according to claim 1, wherein said network stop unit cuts a second sub-connection between the server and the company Intranet.

9. The apparatus according to claim 1, further comprising a deletion countermeasure unit configured to cause deletion of the computer virus in the company Intranet.

10. The apparatus according to claim 1, wherein said collection unit includes an exceptional port communication detection unit configured to detect generation of network communication with a port usually unused to supply the communication data.

11. The apparatus according to claim 1, wherein said collection unit includes an incomplete packet detection unit configured to detect generation of an incomplete packet in packet communication processing based on a predetermined protocol as the communication data.

12. The apparatus according to claim 1, wherein said collection unit includes a traffic measurement unit configured to detect an unusual increase in traffic on the computer network as the communication data.

13. The apparatus according to claim 1, wherein said collection unit includes an error quantity measurement unit configured to detect an increase in a quantity of errors due to network access as the communication data.

* * * * *